(12) United States Patent
Takahashi et al.

(10) Patent No.: US 7,006,742 B2
(45) Date of Patent: Feb. 28, 2006

(54) HIGHLY NONLINEAR OPTICAL FIBER AND HIGHLY NONLINEAR OPTICAL FIBER MODULE

(75) Inventors: Masanori Takahashi, Tokyo (JP); Jiro Hiroishi, Tokyo (JP); Ryuichi Sugizaki, Tokyo (JP); Yuki Taniguchi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/159,200

(22) Filed: Jun. 23, 2005

(65) Prior Publication Data

US 2006/0008221 A1    Jan. 12, 2006

(30) Foreign Application Priority Data

Jul. 12, 2004    (JP)    ............................ 2004-205154
May 19, 2005    (JP)    ............................ 2005-147026

(51) Int. Cl.
G02B 6/00    (2006.01)
G02B 6/02    (2006.01)
G02B 6/16    (2006.01)
G02B 6/18    (2006.01)
G02B 6/20    (2006.01)

(52) U.S. Cl. ...................... 385/122; 385/123; 385/124; 385/126; 385/127; 385/128

(58) Field of Classification Search ..................... None
See application file for complete search history.

(56) References Cited

U.S. PATENT DOCUMENTS

| 5,887,104 | A | 3/1999 | Sugizaki et al. |
| 5,905,838 | A * | 5/1999 | Judy et al. .................. 385/123 |
| 6,347,174 | B1 | 2/2002 | Onishi et al. |
| 6,661,958 | B1 | 12/2003 | Hirano et al. |
| 6,766,087 | B1 | 7/2004 | Hiroishi et al. |
| 6,804,441 | B1 | 10/2004 | Arai et al. |

FOREIGN PATENT DOCUMENTS

| JP | 2002-207136 | 7/2002 |
| WO | WO 2005/015303 A1 | 2/2005 |

* cited by examiner

*Primary Examiner*—Frank G. Font
*Assistant Examiner*—Mary El-Shammaa
(74) *Attorney, Agent, or Firm*—Oblon, Spivak, McClelland, Maier & Neustadt, P.C.

(57) ABSTRACT

A highly nonlinear optical fiber includes a core, a cladding surrounding the core, and a coating covering the cladding. A bending loss at a wavelength of 1550 nanometers with a bending diameter of 20 millimeters is equal to or less than 0.01 dB/m. A nonlinear coefficient at the wavelength of 1550 nanometers is equal to or more than $10\ W^{-1}km^{-1}$. A cut-off wavelength is equal to or less than 1530 nanometers. A zero dispersion wavelength is in a range between 1400 nanometers and 1650 nanometers. A diameter of the coating is 125 micrometers with a tolerance of ±5 percent.

17 Claims, 5 Drawing Sheets

HIGHLY NONLINEAR OPTICAL FIBER AND HIGHLY NONLINEAR OPTICAL FIBER MODULE

BACKGROUND OF THE INVENTION

1. Field of the Invention

The present invention relates to a highly nonlinear optical fiber and a highly nonlinear optical fiber module, and more particularly, to a highly nonlinear optical fiber having a large nonlinear coefficient for optical signal processing making use of nonlinear phenomena and a highly nonlinear optical fiber module serving as a highly nonlinear device that houses the highly nonlinear optical fiber wound in a coil shape.

2. Description of the Related Art

A transmission rate per wavelength channel of optical fiber communication currently put to practical use is 10 Gbit/s. To increase a total transmission capacity without excessively complicating a system in large capacity wavelength division multiplexing (WDM) transmission, it is desirable to increase a transmission rate per channel. Under such circumstances, researches concerning very high-speed optical fiber transmission with a transmission rate of 40 Gbit/s per channel or more have been actively carried out.

In response to the increase in the transmission rate, peak power of a signal increases, and nonlinear phenomena (such as self phase modulation, mutual phase modulation, and four-wave mixing) in an optical fiber appear more conspicuously as peak power of a signal increases. Such nonlinear phenomena cause deterioration in a transmission characteristic. On the other hand, the nonlinear phenomena have an advantage that high-speed responsiveness thereof can be applied to high-speed optical signal processing.

In recent years, a highly nonlinear optical fiber (HNLF) having high nonlinearity has been developed. Following the development, optical signal processing using the highly nonlinear optical fiber is gaining a popularity.

The highly nonlinear optical fiber is used for optical signal processing making use of the nonlinear phenomena. The highly nonlinear optical fiber is not used as a transmission line but formed as a package and incorporated in a transmission apparatus or a light source. When an optical fiber is formed in the package, the highly nonlinear optical fiber is wound around a bobbin or wound annularly without using a bobbin and used.

A volume, which the optical fiber wound in a coil shape in this way occupies in the package, depends on a volume and a percentage of voids of the optical fiber. The percentage of voids is a percentage of a volume, which the optical fiber itself occupies, in a volume V of a portion where the optical fiber is wound. The volume V is represented by the following Eq. (1) in a bobbin shown in FIG. 6. The percentage of voids increases as a cross section of the optical fiber, that is, an outer diameter (hereinafter referred to as coating diameter) of the optical fiber increases.

$$V = W \times \{((d_1-d_2)/2)^2 - (d_2/2)^2\} \times \pi \qquad (1).$$

When a winding diameter of the optical fiber (an inner diameter of the bobbin) is reduced for the purpose of reducing a size of the package, winding distortion of the optical fiber increases. The winding distortion is proportional to a diameter of a cladding (hereinafter referred to as cladding diameter) of the optical fiber. Therefore, it is necessary to reduce the cladding diameter to reduce the winding distortion.

Conventionally, as a highly nonlinear optical fiber with a reduced diameter, an optical fiber with a cladding diameter of 110 micrometers and a coating diameter of 150 micrometers and an optical fiber with a cladding diameter of 89 micrometers and a coating diameter of 115 micrometers have been proposed (see, for example, U.S. Pat. No. 6,661,958).

When the cladding diameter of the highly nonlinear optical fiber is reduced, the winding diameter thereof decreases. However, for example, this makes it difficult to connect the highly nonlinear optical fiber with an optical fiber having a general cladding diameter like an optical fiber for connecting an inspection apparatus. Note that a most general cladding diameter of optical fibers is about 125 micrometers and a coating diameter thereof is about 250 micrometers.

To guarantee a quality of the optical fiber, the optical fiber undergoes inspections concerning five to ten items like a transmission loss and a dispersion characteristic after manufacturing. The highly nonlinear optical fiber also undergoes the same inspections.

When, for example, an optical time domain reflectometer (OTDR) for measuring a transmission loss is used as an inspection apparatus, an optical fiber to be inspected is connected to the OTDR through the optical fiber for connecting an inspection apparatus.

As a method of connecting optical fibers each other, there are a fusion splicing method and a butt joint method. In the fusion splicing method, in a state in which coatings at connection ends of an optical fiber to be inspected and an optical fiber for connecting an inspection apparatus are removed, fiber end faces of both the optical fibers are heated and fused while optical axes thereof are fit. It is possible to decrease a connecting loss by using this method. However, the fusion requires time and labor.

On the other hand, in the butt joint method, the coatings at the connection ends of both the optical fibers are removed to expose glass sections, and end faces of the glass sections are butted against each other on a V groove to be connected. In this butt joint method, it is possible to connect the optical fibers in a short time.

It is not easy to connect the highly nonlinear optical fiber with a small diameter and the optical fiber for connecting an inspection apparatus with a general diameter on a V groove because cladding diameters of both the optical fibers are different.

SUMMARY OF THE INVENTION

It is an object of the present invention to at least solve the problems in the conventional technology.

A highly nonlinear optical fiber according to one aspect of the present invention includes a core, a cladding surrounding the core, and a coating covering the cladding. A bending loss at a wavelength of 1550 nanometers with a bending diameter of 20 millimeters is equal to or less than 0.01 dB/m. A nonlinear coefficient at the wavelength of 1550 nanometers is equal to or more than 10 $W^{-1}km^{-1}$. A cut-off wavelength is equal to or less than 1530 nanometers. A zero dispersion wavelength is in a range between 1400 nanometers and 1650 nanometers. A diameter of the coating is 125 micrometers with a tolerance of ±5 percent.

A highly nonlinear optical fiber module according to another aspect of the present invention includes a highly nonlinear optical fiber including a core, a cladding surrounding the core, and a coating covering the cladding. A bending loss at a wavelength of 1550 nanometers with a bending diameter of 20 millimeters is equal to or less than 0.01 dB/m. A nonlinear coefficient at the wavelength of 1550 nanometers is equal to or more than 10 $W^{-1}km^{-1}$. A cut-off wavelength is equal to or less than 1530 nanometers. A zero dispersion wavelength is in a range between 1400 nanometers and 1650 nanometers. A diameter of the coating is 125 micrometers with a tolerance of ±5 percent.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

A nonlinear coefficient γ, which is a parameter indicating a nonlinear characteristic of a highly nonlinear fiber, is represented by Eq. (2). In the expression, λ is a wavelength of light, n2 is a nonlinear refractive index of the highly nonlinear fiber, and Aeff is an effective cross section.

$$\gamma = (2\pi/\lambda) \times (n2/Aeff) \quad (2)$$

It is possible to cause nonlinear phenomena efficiently by increasing the nonlinear coefficient γ. It is preferable that the highly nonlinear fiber has the nonlinear coefficient γ of $10W^{-1}km^{-1}$ or more to suitably function as the highly nonlinear fiber. To increase $\lambda_c$ it is sufficient to increase n2 and reduce Aeff in Eq. (2). However, when γ is increased by such a method, a cut-off wavelength shifts to a long wavelength side. The cut-off wavelength means a fiber cut-off wavelength $\lambda_c$ defined in the ITU-T (International Telecommunication Union-Telecommunication sector) G.650.1.

To cause the nonlinear phenomena efficiently, it is important to set the cut-off wavelength shorter than an amplification band of an Er-doped fiber amplifier (EDFA). Therefore, it is preferable to set the cut-off wavelength to 1530 nanometers or less. In addition, when it is attempted to perform wavelength conversion making use of the nonlinear phenomena, it is necessary to set a wavelength of pumping light to a wavelength around a zero dispersion wavelength of an optical fiber. Thus, it is preferable to set a zero dispersion wavelength of the highly nonlinear fiber in a range between 1400 nanometers and 1650 nanometers.

A highly nonlinear fiber that can hold down a cut-off wavelength while securing sufficient nonlinearity is explained below. Note that terms not specifically defined in the following description shall follow the definitions and the measurement method in the ITU-T G. 650.

Figure 1:
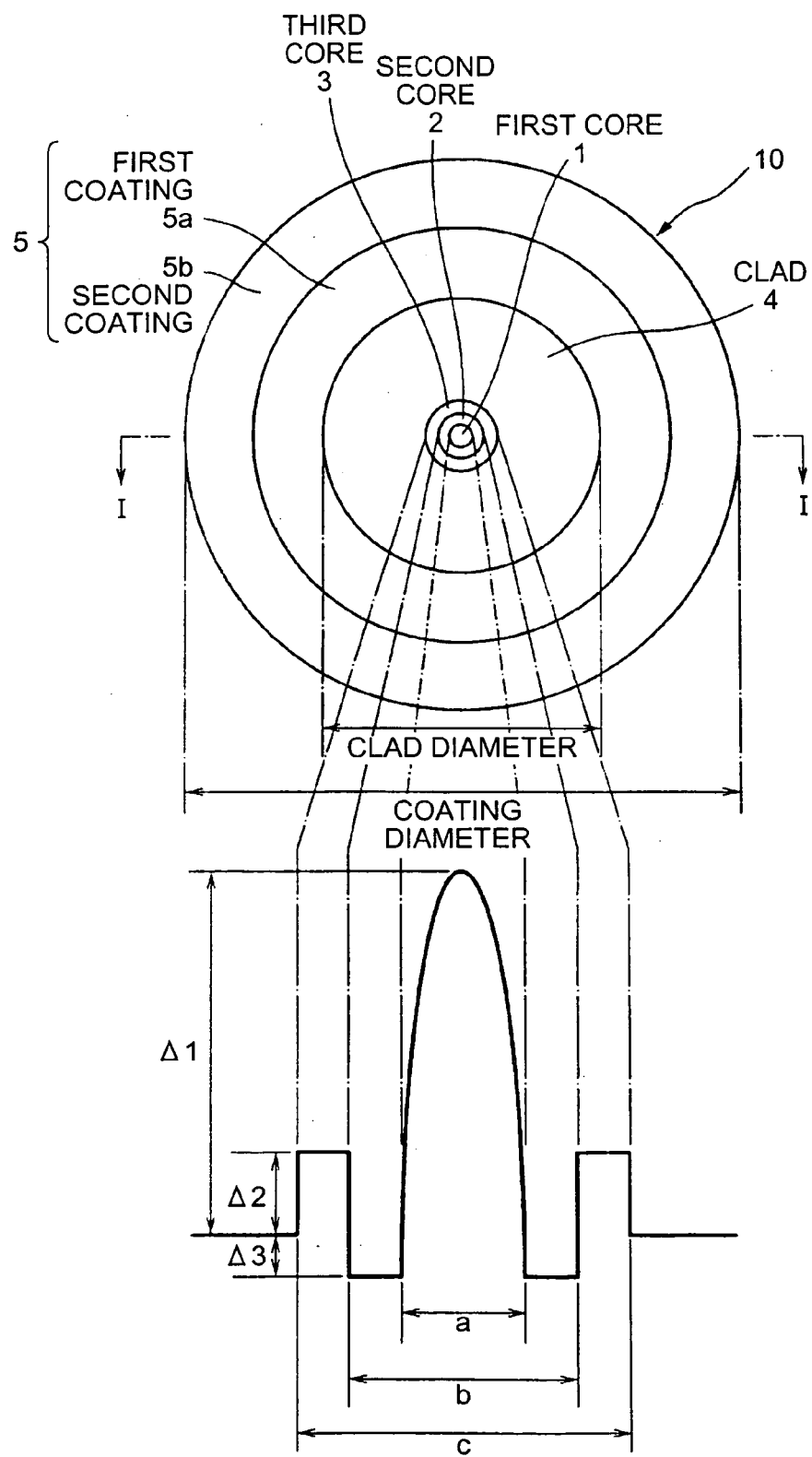
FIG. 1 is a cross section and a refractive index profile of an example of a highly nonlinear fiber in an embodiment of the present invention.

FIG. 1 is a cross section of a highly nonlinear fiber in an embodiment of the present invention and a schematic refractive index profile in a radial direction of the highly nonlinear fiber. In the cross section, the highly nonlinear fiber has a sectional structure perpendicular to a central axis thereof. An abscissa of the refractive index profile corresponds to a position along line I—I in the cross section of the highly nonlinear fiber, although a scale thereof is different from that of the cross section.

In FIG. 1, a highly nonlinear fiber 10 has a first core 1 with a diameter of a micrometers including an optical axis center, a second core 2 with a diameter of b micrometers surrounding the first core 1, a third core 3 with a diameter of c micrometers surrounding the second core 2, and a cladding 4 surrounding the third core 3. The first to the third cores 1 to 3 and the cladding 4 are formed of, for example, a silica ($SiO_2$) based material. A diameter of the cladding 4, that is, a cladding diameter d is set as small as, for example, 40, 50, 60, 70, or 80 micrometers to realize a reduction in a diameter of a bobbin around which the highly nonlinear fiber 10 is wound.

The first core 1 is formed to have a maximum refractive index of $n_{c1}$ with a predetermined amount of $GeO_2$ doped to $SiO_2$ as a dopant. The second core 2 is formed of a material having a refractive index lower than that of the cladding 4 and having a minimum refractive index of $n_{c2}$ with, for example, a predetermined amount of F doped to $SiO_2$. The third core 3 has a refractive index higher than that of the cladding 4 and lower than that of the first core 1, and is formed to have a maximum refractive index of $n_{c3}$ with, for example, a predetermined amount of $GeO_2$ doped to $SiO_2$. Note that the first core 1, the second core 2, and the third core 3 are also referred to as a center core section, a depressed layer, and a side core layer, respectively.

The cladding 4 has a refractive index of $n_c$ and is, in general, substantially formed of pure $SiO_2$. However, the cladding 4 may be added with F.

The respective refractive indexes $n_{c1}$, $n_{c2}$, $n_{c3}$, and $n_c$ of the first core 1, the second core 2, the third core 3, and the cladding 4 are set to have a relation $n_{c1} > n_{c3} > n_c > n_{c2}$. A refractive index profile of such a highly nonlinear fiber 10 is called a W-segment type.

A relative refractive index difference in the profile shown in FIG. 1 is represented as follows. Based on the refractive index $n_c$ of the cladding 4, a relative refractive index difference Δ1 of the first core 1 is calculated by Eq. (3), a relative refractive index difference Δ2 of the second core 2 is calculated by Eq. (4), and a relative refractive index difference Δ3 of the third core 3 is calculated by Eq. (5).

$$\Delta 1 = \{(n_{c1} - n_c)/n_{c1}\} \times 100\% \quad (3)$$

$$\Delta 2 = \{(n_{c2} - n_c)/n_{c2}\} \times 100\% \quad (4)$$

$$\Delta 3 = \{(n_{c3} - n_c)/n_{c3}\} \times 100\% \quad (5)$$

It is desirable that the highly nonlinear fiber has the relative refractive index difference Δ1 of 2.0 percent or more and the relative refractive index difference Δ2 of −0.3 percent or less to secure a sufficient characteristic.

In the outer periphery of the cladding 4, an ultraviolet curing resin layer is formed as a coating 5 having a two-layer structure. A first coating 5a on the inner side is formed of a material having a Young's modulus lower than that of a second coating 5b on the outer side. A diameter of the outer periphery of the coating 5, that is, a coating diameter is set as small as, for example, 125 micrometers ±5%.

To reduce a size of a package in which the highly nonlinear fiber is stored, the cladding diameter and the coating diameter of the highly nonlinear fiber are optimized and processing efficiency in performing inspections for the highly nonlinear fiber is optimized.

For the reduction in a size of the package, it is necessary to wind the highly nonlinear fiber around a smaller bobbin in a coil shape or wind the highly nonlinear fiber around a ring with a smaller diameter in a coil shape without using a bobbin. To wind the highly nonlinear fiber 10 at a smaller winding diameter, it is necessary to reduce the coating diameter of the highly nonlinear fiber 10.

A length of the highly nonlinear fiber with respect to one package depends on a characteristic of the highly nonlinear fiber 10 and design of an application. In other words, when the nonlinear coefficient γ is large, the highly nonlinear fiber 10 is short and, when the nonlinear coefficient γ is small, the highly nonlinear fiber 10 is long. For example, a highly nonlinear fiber with a large nonlinear coefficient γ is about 400 meters at the longest.

To modularize and store the highly nonlinear fiber 10 in a package, the highly nonlinear fiber 10 is wound around, for example, a bobbin and used. A dimension of the bobbin depends on a volume and a percentage of voids of the highly nonlinear fiber 10. For example, when a diameter of the coating 5 of the highly nonlinear fiber 10 is set to 100 micrometers to 250 micrometers, the percentage of voids is substantially fixed at 65 percent. Therefore, a diameter of the bobbin depends on a volume of the highly nonlinear fiber 10. When a length of the highly nonlinear fiber 10 is fixed, a diameter of the bobbin depends on a coating diameter of the highly nonlinear fiber 10. Therefore, to reduce a size of the bobbin, the coating diameter of the highly nonlinear fiber 10 only has to be reduced.

The same holds true when the highly nonlinear fiber 10 is formed in a ring coil shape without using a bobbin. A reduction in the coating diameter of the highly nonlinear fiber 10 leads to a reduction in a volume of the ring coil.

To reduce the coating diameter of the highly nonlinear fiber 10, effects obtained by applying the coating 5 to the highly nonlinear fiber 10 have to be considered.

A first purpose of the coating is to prevent glass forming the first to the third cores 1 to 3 and the cladding 4 from being scratched to be deteriorated in strength. A second purpose of the coating is to prevent a transmission characteristic from being deteriorated because of distortion caused by a stress applied to the highly nonlinear fiber 10.

Therefore, to attain the first purpose, the coating 5 is required to have thickness sufficient for preventing a foreign matter from coming into contact with the glass. The coating can show a sufficient effect even if the thickness is smaller than that of the coating 5 for the second purpose for relaxing the stress applied to the highly nonlinear fiber 10.

The thickness of the coating 5 depends on thickness for attaining the second purpose. To prevent deterioration in a transmission characteristic due to distortion of the first to the third cores 1 to 3 and the cladding 4, it is preferable to form the coating 5 in a two-layer structure as shown in FIG. 1. A Young's modulus of resin forming the first coating 5a on the inner side is set low and a Young's modulus of resin forming the second coating 5b on the outer side is set high. As a result, a so-called shell effect occurs to prevent an external force from being transmitted to the first to the third cores 1 to 3 and the cladding 4.

A general optical fiber is formed as a cable and used in various fields. Thus, an external diameter of the coating 5 thereof is set to about 250 micrometers. On the other hand, since the highly nonlinear fiber 10 is processed in a coil shape and used in an apparatus as described above, a stress applied thereto is small compared with the optical fiber formed as a cable. Therefore, it is possible to design thickness of the coating 5 to be smaller than that of the general optical fiber.

Other than the viewpoint of prevention of distortion due to an external force, it is also possible to reduce a core diameter and a cladding diameter to reduce the coating diameter of the highly nonlinear fiber 10.

A mode field diameter (MFD) of the highly nonlinear fiber 10 is usually equal to or smaller than 5 micrometers in a wavelength band of 1.55 micrometers (1530 nanometers to 1570 nanometers). In general, a cladding diameter about ten times as large as a mode field diameter is necessary such that light is propagated smoothly.

Therefore, in the case of the highly nonlinear fiber 10, if a cladding diameter is at least about 40 micrometers, it is possible to propagate light in the same manner as an optical fiber having a larger cladding diameter.

When a diameter of the cladding 4 of the highly nonlinear fiber 10 is reduced in this way, it is possible to reduce a coating diameter without changing thickness in a radial direction of the coating 5. Thus, even if a function of the coating 5 is kept at a level same as that in the general optical fiber, it is possible to reduce a diameter of the highly nonlinear fiber 10.

Consequently, in addition to reducing thickness of the coating 5 of the highly nonlinear fiber 10, it is possible to further reduce the coating diameter through the reduction in a diameter of the cladding 4. This is advantageous for a reduction in a size of a package.

On the other hand, to secure reliability of the highly nonlinear fiber 10, it is important to hold down distortion of the highly nonlinear fiber 10. Winding distortion of the highly nonlinear fiber 10 is proportional to a cladding diameter. Thus, it is possible to reduce a winding diameter of the highly nonlinear fiber 10 while controlling an increase in the winding distortion of the highly nonlinear fiber 10 by reducing a cladding diameter of the highly nonlinear fiber 10. This is advantageous for a reduction in a size of a coil.

Figure 2:
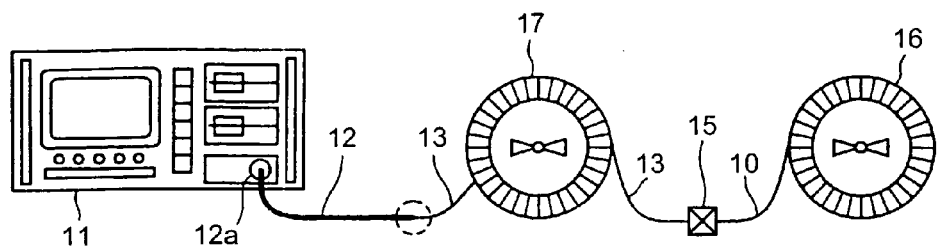
FIG. 2 is a schematic of a system for measuring a characteristic of the highly nonlinear fiber according to the present embodiment.

FIG. 2 is a schematic of a state of measurement for inspecting an optical transmission loss and the like using an OTDR apparatus. In FIG. 2, a connector 12a of an optical fiber with connector 12 is connected to an OTDR apparatus 11. As shown in a portion surrounded by a broken line in FIG. 2, one end of a dummy fiber 13 for connecting an inspection apparatus is fusion-spliced to an end on a side without a connector of the optical fiber with connector 12.

The optical fiber with connector 12 and the dummy fiber 13 are formed by a single-mode optical fiber having a cladding diameter of 125 micrometers and a coating diameter of 250 micrometers. The dummy fiber 13 is a fiber for supplementing a length of the optical fiber with connector 12 and is wound around a bobbin 17 in multiple folds. An optical fiber with a general diameter is used as the dummy fiber 13 to connect the dummy fiber 13 with various optical fibers.

The other end of the dummy fiber 13 is connected to one end of the highly nonlinear fiber 10 to be measured, which is wound around the bobbin 16, by a V-groove device 15.

Note that, in the following explanation, it is assumed that the highly nonlinear fiber 10 with a coating diameter of 125 micrometers is used.

Figure 3:
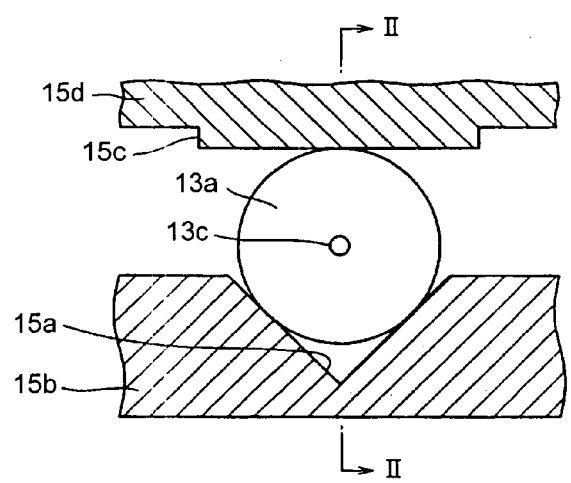
FIG. 3 is a cross section of a V-groove device used in measuring a characteristic of the highly nonlinear fiber according to the present embodiment.

As shown in FIG. 3, the V-groove device 15 includes a V-groove washer 15b made of metal, which has a V groove 15a, and a pressing plate 15d made of acrylic, which has a projected portion 15c in a part opposed to the V groove 15a. Note that FIG. 3 is a cross section of a state in which a cladding 13a and a core 13c, which are exposed by removing the coating at the end of the dummy fiber 13, are sandwiched between the V groove 15a and the pressing plate 15d.

The V groove 15a of the V-groove washer 15b is formed linearly at an identical width and an identical depth. Thus, after removing the coatings at the ends of the dummy fiber 13 and the highly nonlinear fiber 10 with a small diameter as usual, when end faces thereof are butted against with each other on the V groove 15a by the butt joint method, positions of the first cores 1 and 13c thereof deviate from each other. This is because diameters of the cladding 4 and the cladding 13a of the first cores 1 and 13c are different greatly. As a result, a connecting loss increases and measurement accuracy falls.

Therefore, the coating at the end of the dummy fiber 13 is removed to expose the end face of the cladding 13. On the other hand, the end face of the highly nonlinear fiber 10 is exposed while the coating 5 is kept.

Figure 4:
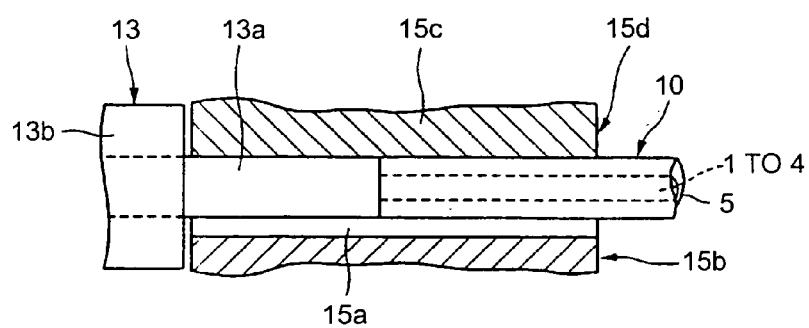
FIG. 4 is a cross section of a state in which the highly nonlinear fiber according to the present embodiment and a dummy fiber are connected using the V-groove device.

Thereafter, as shown in FIG. 4, a certain end face of the coating of the highly nonlinear fiber 10 and an end face of a glass section of the dummy fiber 13 are butted against each other on the V groove 15. Then, a position of the core 13c of the dummy fiber 13 and a position of the first core 1 of the highly nonlinear fiber 10 substantially coincide with each other and the first cores 1 and 13a are connected satisfactorily. Note that FIG. 4 is a cross section along line II—II in FIG. 3, although a scale different from that in FIG. 3 is used.

An ordinary single-mode optical fiber with a cladding diameter of 125 micrometers was used as the dummy fiber 13 and plural highly nonlinear fibers with a small diameter, which had different coating diameters, were prepared as the highly nonlinear fiber 10. The dummy fiber 13 and the highly nonlinear fibers were connected as shown in FIG. 4. When a connecting loss with respect to values of the coating diameters of the highly nonlinear fibers was measured in this state, a result shown in FIG. 5 was obtained.

Figure 5:
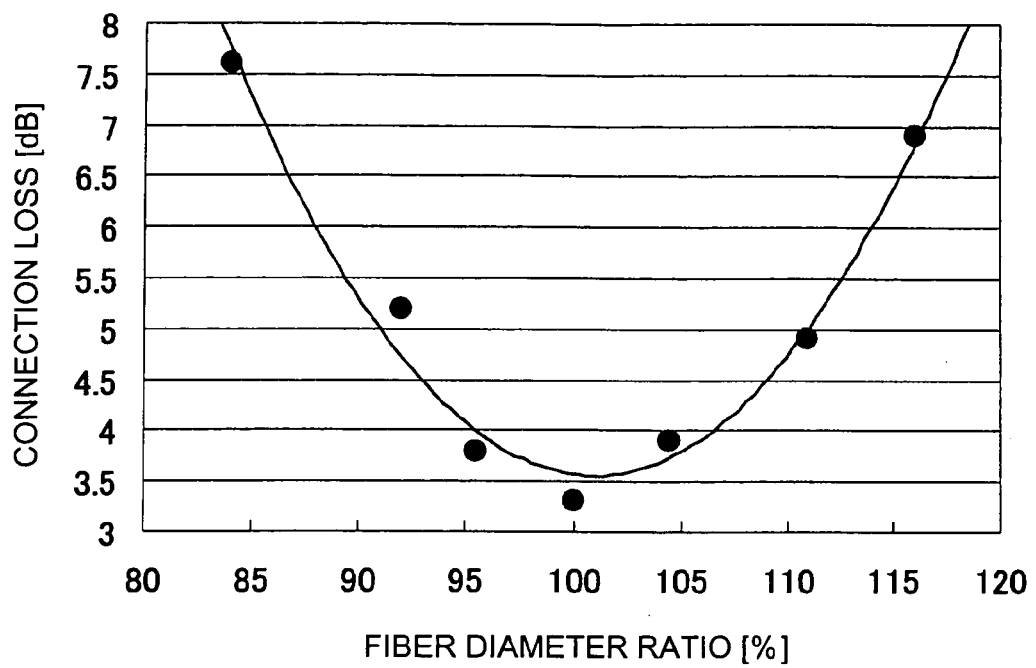
FIG. 5 is a graph of a relation between a connecting loss of connection of the highly nonlinear fiber according to the present embodiment and a general optical fiber and an optical fiber diameter ratio.

In FIG. 5, the abscissa indicates a fiber diameter ratio, which is a ratio of the coating diameters of the highly nonlinear fibers to the cladding diameter 125 micrometers of the dummy fiber 13. The ordinate indicates a connecting loss of the dummy fiber 13 and the highly nonlinear fiber 10.

According to FIG. 5, it is seen that, when the fiber diameter ratio rises to ±5% or more, the connecting loss increases rapidly.

Therefore, the butt joint method for connecting the highly nonlinear fiber 10 with a small diameter and the dummy fiber 13 using the V-groove device 15 as shown in FIG. 4 is adopted. Then, if the highly nonlinear fiber 10 having a coating diameter, which is 95 to 105 percent as large as the cladding diameter of the dummy fiber 13, is used, the highly nonlinear fiber 10 and the dummy fiber 13 are connected satisfactorily.

Main characteristics of the highly nonlinear fiber 10 with a small diameter are shown in Tales 1 to 3. In measuring these characteristics, as shown in FIGS. 3 and 4, the highly nonlinear fiber 10 with a small diameter to be measured was held by the V groove 15a and the pressing plate 15d without stripping the coating thereof. As a result, the characteristics were successfully measured using the general-purpose dummy fiber 13 with a cladding diameter of 125 micrometers. Note that a sign Φ in an item "bending loss" in the tables indicates a bending diameter.

TABLE 1

Δ1: 2.8% Δ2: −0.55% Δ3: 0.3%, a/b: 0.6, b/c: 1.25, b: 6.7 μm

| | | | | | | |
|---|---|---|---|---|---|---|
| Fiber length | km | 0.4 | 0.4 | 0.4 | 0.4 | 0.4 |
| Fiber diameter | μm | 80 | 70 | 60 | 50 | 40 |
| Coating diameter | μm | 128 | 127 | 125 | 124 | 123 |
| Loss(1550 nm) | dB/km | 0.91 | 0.87 | 0.84 | 0.84 | 0.82 |
| Dispersion value(1550 nm) | ps/(nm · km) | 0.12 | 0.57 | 0.31 | 0.21 | 0.35 |
| Dispersion slope(1550 nm) | ps/(nm$^2$ · km) | 0.015 | 0.012 | 0.011 | 0.013 | 0.018 |
| $\lambda_0$ | nm | 1542.0 | 1502.5 | 1521.8 | 1533.8 | 1530.6 |
| Cut-off wavelength | nm | 1456 | 1383 | 1425 | 1401 | 1425 |
| MFD(1550 nm) | μm | 4.0 | 4.1 | 4.1 | 4.0 | 4.1 |
| Aeff(1550 nm) | μm$^2$ | 11.2 | 11.3 | 11.3 | 11.2 | 11.5 |
| PMD | ps/km$^{1/2}$ | 0.10 | 0.12 | 0.08 | 0.09 | 0.11 |
| Bending loss(φ20 nm, 1550 nm) | dB/m | <0.01 | <0.01 | <0.01 | <0.01 | <0.01 |
| γ | 1/W/km | 19.1 | 20.1 | 19.3 | 18.2 | 18.5 |

TABLE 2

Δ1: 2.8% Δ2: −1.0% Δ3: 0.3%, a/b: 0.4, b/c: 1.25, b: 9.1 μm

| | | | | | | |
|---|---|---|---|---|---|---|
| Fiber length | km | 0.4 | 0.4 | 0.4 | 0.4 | 0.4 |
| Fiber diameter | μm | 80 | 70 | 60 | 50 | 40 |
| Coating diameter | μm | 129 | 127 | 125 | 124 | 123 |
| Loss(1550 nm) | dB/km | 1.21 | 1.20 | 1.15 | 1.09 | 1.03 |
| Dispersion value(1550 nm) | ps/(nm · km) | 0.12 | −0.31 | 0.55 | −0.54 | 0.32 |
| Dispersion slope(1550 nm) | ps/(nm² · km) | 0.011 | 0.011 | 0.010 | 0.014 | 0.010 |
| $\lambda_0$ | nm | 1538.6 | 1577.4 | 1496.1 | 1589.7 | 1517.0 |
| Cut-off wavelength | nm | 1401 | 1358 | 1310 | 1287 | 1355 |
| MFD(1550 nm) | μm | 35 | 34 | 3.4 | 3.5 | 3.5 |
| Aeff(1550 nm) | μm² | 10.3 | 10.1 | 10.2 | 10.3 | 10.3 |
| PMD | ps/km½ | 0.05 | 0.12 | 0.22 | 0.30 | 0.09 |
| Bending loss(φ20 nm, 1550 nm) | dB/m | <0.01 | <0.01 | <0.01 | <0.01 | <0.01 |
| γ | 1/W/km | 23.1 | 24.1 | 23.3 | 23.2 | 23.8 |

TABLE 3

Δ1: 2.0% Δ2: −0.55% Δ3: 0.3%, a/b: 0.57, b/c: 1.25, b: 7.8 μm

| | | | | | | |
|---|---|---|---|---|---|---|
| Fiber length | km | 0.4 | 0.4 | 0.4 | 0.4 | 0.4 |
| Fiber diameter | μm | 80 | 70 | 60 | 50 | 40 |
| Coating diameter | μm | 128 | 126 | 124 | 123 | 123 |
| Loss(1550 nm) | dB/km | 0.38 | 0.38 | 0.36 | 0.35 | 0.35 |
| Dispersion value(1550 nm) | ps/(nm · km) | 0.56 | −0.25 | 0.61 | 0.05 | −0.22 |
| Dispersion slope(1550 nm) | ps/(nm² · km) | 0.023 | 0.023 | 0.017 | 0.018 | 0.008 |
| $\lambda_0$ | nm | 1526.0 | 1561.1 | 1514.7 | 1547.2 | 1579.3 |
| Cut-off wavelength | nm | 1225 | 1258 | 1191 | 1207 | 1185 |
| MFD(1550 nm) | μm | 4.5 | 4.4 | 4.6 | 4.5 | 4.4 |
| Aeff(1550 nm) | μm² | 14.2 | 13.5 | 14.5 | 14.2 | 14.4 |
| PMD | ps/km½ | 0.13 | 0.04 | 0.02 | 0.06 | 0.03 |
| Bending loss(φ20 nm, 1550 nm) | dB/m | <0.01 | <0.01 | <0.01 | <0.01 | <0.01 |
| γ | 1/W/km | 12.5 | 12.4 | 11.8 | 12.3 | 12.7 |

A mode field diameter of the highly nonlinear fiber 10 is usually around 4 micrometers, which is extremely small compared with an ordinary single-mode optical fiber. Thus, taking into account connectivity and the like, it is a general practice to connect an end of a highly nonlinear fiber wound in multiple folds in a package and an end of a single-mode optical fiber with the fusion splicing method and connect the highly nonlinear fiber to a general optical fiber outside the package through the single-mode optical fiber.

A single-mode optical fiber with a reduced cladding diameter was manufactured and fusion-spliced with a highly nonlinear fiber with a small diameter to form a small module of a highly nonlinear fiber described in the following examples.

Figure 6:
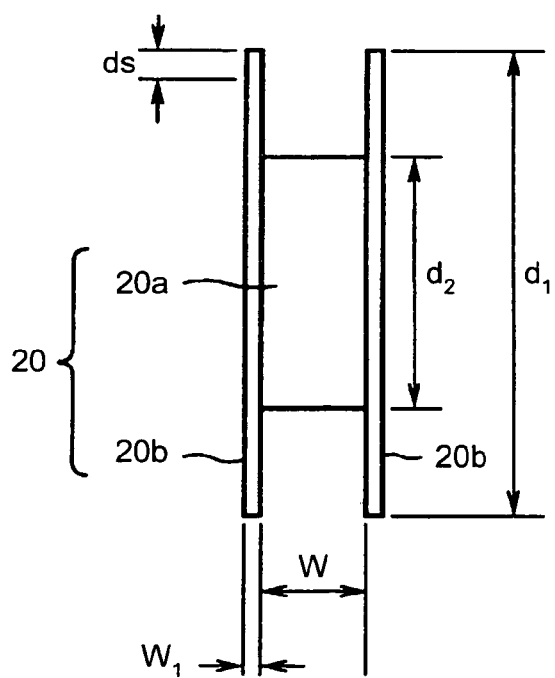
FIG. 6 is a side view of a bobbin used for winding the highly nonlinear fiber according to the present embodiment.
Figure 7:
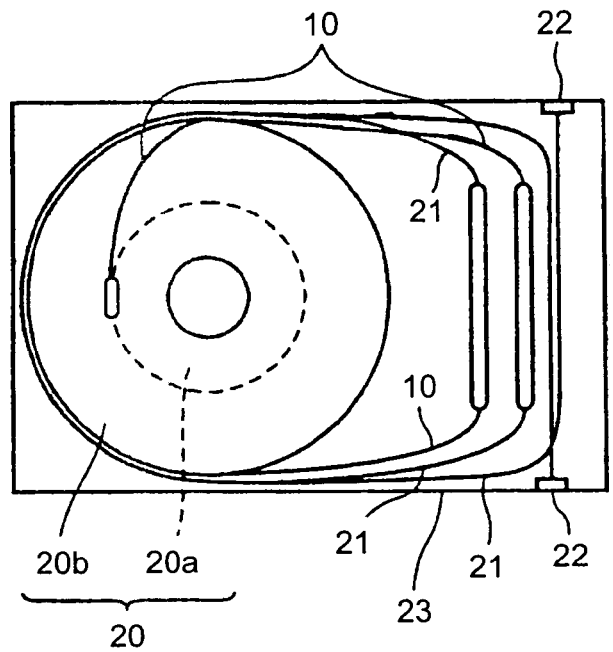
FIG. 7 is a schematic of a highly nonlinear fiber module in which the highly nonlinear fiber according to the present embodiment is wound around the bobbin and stored in a housing.

The small module is manufactured in a structure shown in FIG. 7 using a bobbin 20 shown in FIG. 6. If a bobbin is not used, the small module is manufactured in a structure shown in FIG. 8.

In a first example, the highly nonlinear fiber 10 with a cladding diameter of 80 micrometers and a coating diameter of 125 micrometers, which has the structure shown in FIG. 1, was used as a highly nonlinear fiber and wound around the bobbin 20 shown in FIG. 6 at a length of 400 meters to manufacture a module. In this case, a winding diameter in the bobbin 20, that is, an inner diameter $d_2$ of the bobbin 20 was set to 45 millimeters taking into account winding distortion of the highly nonlinear fiber 10. Note that the inner diameter $d_2$ of the bobbin 20 indicates an outer diameter of a body 20a of the bobbin 20.

In this case, since the coating diameter of the highly nonlinear fiber 10 is set to 125 micrometers, it is possible to reduce a volume of the highly nonlinear fiber 10 to one quarter of an optical fiber with a coating diameter of 250 micrometers. This leads to a reduction in a size of a bobbin.

Therefore, the bobbin 20 has a shape in which the inner diameter $d_2$ is set to 45 millimeters, an outer diameter $d_1$ of collar sections 20b is set to 65 millimeters, an inner width W between the two collar sections 20b is set to 5 millimeters, and a width $W_1$ of the collar sections 20b is set to 1 millimeter.

As shown in FIG. 7, one ends of single-mode optical fibers 21 with a cladding diameter of 80 micrometers were fusion-spliced to both ends of the highly nonlinear fiber 10 formed in a coil shape. Then, the highly nonlinear fiber 10 was stored in a housing 23 in a state in which ferrules (connectors) 22 were attached to the other ends of the single-mode optical fibers 21.

Consequently, a highly nonlinear optical module (HNLM) with single-mode optical fibers drawn out from ferrules was manufactured.

As described above, a splicing loss in the fusion splicing with the highly nonlinear fiber 10 with a cladding diameter of 80 micrometers was successfully controlled to be 0.1 decibel or less by using the single-mode optical fibers 21 with a cladding diameter of 80 micrometers.

Taking into account easiness to use of an optical fiber, fusion splicing of the single-mode optical fibers 21 with a cladding diameter of 105 micrometers and the highly nonlinear fiber 10 with a small diameter was attempted. When the highly nonlinear fiber with a cladding diameter of 80 micrometers was used, a splicing loss of fusion splicing with the single-mode optical fibers 21 was successfully controlled to be 0.1 decibel or less. It is possible to connect a single mode fiber with a cladding diameter of 125 micrometers attached with a connector to this module and use the single mode fiber.

Since the bobbin 20 was reduced in a size as described above, a size of the module was successfully reduced to 70 millimeters in length, 100 millimeters in width, and 10 millimeters in height. Note that an inner diameter of the bobbin may be set to 20 to 60 millimeters and an inner width thereof may be set to 5 to 20 millimeters.

In a second example, an optical fiber with a cladding diameter of 60 micrometers was used as the highly nonlinear fiber 10 and wound around the bobbin 20 shown in FIG. 6 at a length of 400 meters to manufacture a module. In this case, a winding diameter, that is, the inner diameter $d_2$ of the bobbin 20 was set to 30 millimeters taking into account winding distortion of the highly nonlinear fiber 10. The bobbin 20 has a shape in which the outer diameter $d_1$ of the collar sections 20b in the bobbin 20 is set to 55 millimeters, the inner width W between the collar sections 20b is set to 5 millimeters, and the width $W_1$ of the collar sections 20b is set to 1 millimeter.

As shown in FIG. 7, one ends of single-mode optical fibers 21 with a cladding diameter of 80 micrometers were fusion-spliced to both ends of the highly nonlinear fiber 10 formed in a coil shape. Then, the coil was stored in the housing 23 in a state in which the ferrules 22 were attached to the other ends of the single-mode optical fibers 21.

Consequently, a highly nonlinear optical module (HNLM) with single-mode optical fibers drawn out from ferrules was manufactured.

As described above, a splicing loss in the fusion splicing with the highly nonlinear fiber 10 with a cladding diameter of 60 micrometers was successfully controlled to be 0.1 decibel or less by using the single-mode optical fibers 21 with a cladding diameter of 80 micrometers.

Taking into account easiness to use of an optical fiber, the single-mode optical fibers 21 with a cladding diameter of 105 micrometers was applied. A splicing loss of fusion splicing of the single-mode optical fibers 21 with a cladding diameter of 105 micrometers and the highly nonlinear fiber 10 with a cladding diameter of 60 micrometers was successfully controlled to be 0.2 decibel or less. It is possible to connect a single mode fiber with a cladding diameter of 125 micrometers attached with a connector to this module and use the single mode fiber. Note that an inner diameter of the bobbin may be set to 20 to 40 millimeters and an inner width thereof may be set to 5 to 10 millimeters.

Since the bobbin 20 was reduced in a size as described above, a size of the module was also reduced to 60 millimeters in length, 90 millimeters in width, and 10 millimeters in height.

In the first and the second example described above, it is possible to change a size of the bobbin 20, around which the highly nonlinear fiber 10 wound, by changing a balance between the collar width $d_1$ and the inner width W according to an application of the module.

A size of the bobbin 20 shown in FIG. 6 depends on a volume and a percentage of voids of an optical fiber. In this explanation, a coating diameter of the optical fiber is set to 100 micrometers to 250 micrometers and the percentage of voids is substantially fixed at 65 percent. Thus, the dimension of the bobbin 20 depends on the volume of the optical fiber.

A relation between a fiber volume (a fiber length and a coating diameter) and a bobbin size is represented by Eq. (6). In Eq. (6), L is a fiber length and $d_f$ is a coating diameter.

$$L = 650W \times \{(d_1-d_2)^2 - d_2^2/d_f^2\} \times \pi \tag{6}$$

Eq. (7) is obtained from Eq. (6).

$$d_1 = \sqrt{\{(L/650W) + d_2^2/d_f^2\}} \tag{7}$$

Note that, if the optical fiber is wound to have the same diameter as the collar diameter $d_1$, collapse of winding occurs. Thus, a slight difference is required between the collar diameter $d_1$ and a diameter of winding of the optical fiber. This difference of diameters is defined as a margin $d_5$. The margin $d_1$ is preferably 2 to 10 millimeters to prevent the collapse of winding of the optical fiber and realize a reduction in a size of a package. Therefore, taking into account the margin $d_s$, the collar diameter $d_1$ preferably satisfies the following relation.

$$\sqrt{\{(L/650W) + d_2^2/d_f^2\}} + 2 \leq d_1 \leq \sqrt{\{(L/650W) + d_2^2/d_f^2\}} + 10 \tag{8}$$

A small bobbin has a size indicated below as an example when the relation (8) is used.

For example, when L is 400 meters, $d_2$ is 30 millimeters, W is 5 millimeters, and $d_f$ is 125 micrometers, $d_1$ is calculated as $55.1 \leq d_1 \leq 63.1$ millimeters. Thus, it is possible obtain to a bobbin with $d_1$ smaller than 60 millimeters. In addition, when L is 400 meters, $d_2$ is 30 millimeters, W is 10 millimeters, and $d_f$ is 125 micrometers, $d_1$ is calculated as $45.1 \leq d_1 \leq 53.1$ millimeters. Thus, it is possible to obtain a bobbin with $d_1$ smaller than 50 millimeters. Moreover, when L is 400 meters, $d_2$ is 30 millimeters, W is 20 millimeters, and $d_f$ is 125 micrometers, $d_1$ is calculated as $39.2 \leq d_2 \leq 47.2$ millimeters. Thus, it is possible to obtain a bobbin with $d_1$ smaller than 45 millimeters.

When an optical fiber with a coating diameter of 125 micrometers is wound at a length of 400 meters, as a size of a bobbin with an inner diameter of 45 millimeters, it is possible to reduce the inner width to 15 millimeters and reduce the collar diameter to 5 millimeters from the size described above. In addition, as a size of a bobbin with an inner diameter of 30 millimeters, it is possible to reduce the inner width to 15 millimeter and reduce the collar diameter to 45 millimeters from the size described above.

In a module using a highly nonlinear fiber, a fiber length to be used is set according to parameters of an optical fiber and an application of the module. For the purpose of fixing the optical fiber stably, when an optical fiber with a predetermined length is used, the optical fiber is wound around a bobbin and used. However, when an optical fiber is short, it is not always necessary to use a bobbin. A module manufactured by winding an optical fiber in a ring coil shape without using a bobbin is explained below as a third example.

Figure 8:
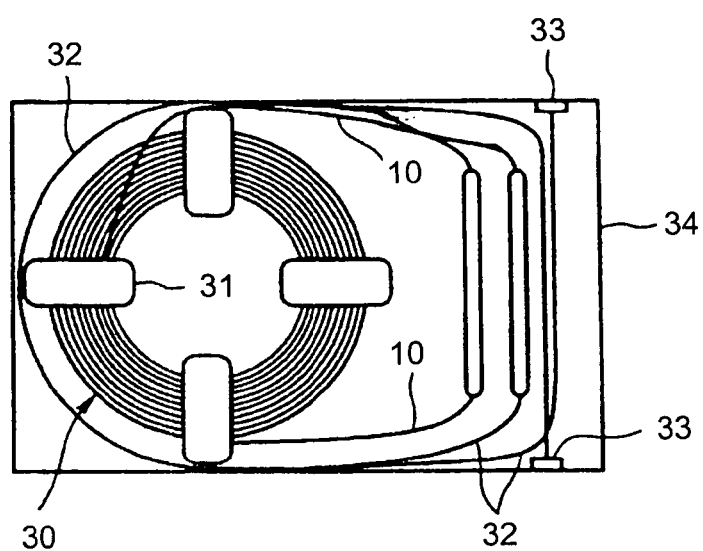
FIG. 8 is a schematic of a highly nonlinear fiber module in which the highly nonlinear fiber according to the present embodiment is wound without using the bobbin and stored in a housing.

FIG. 8 is a schematic of a module formed by winding a highly nonlinear fiber in a ring coil shape without using a bobbin.

First, the highly nonlinear fiber 10 with a cladding diameter of 80 micrometers shown in FIG. 1 was used as a highly nonlinear fiber and wound in a ring coil shape at a length of 100 meters to manufacture a module. An inner diameter of a ring coil 30 was set to 45 millimeters taking into account reliability. Note that the ring coil 30 is prevented from fluctuating by a binding tool 31.

One ends of single-mode optical fibers 32 with a cladding diameter of 80 micrometers were spliced to both ends of the highly nonlinear fiber 10 wound in a ring coil shape with the fusion splicing method. The highly nonlinear fiber 10 was wound annularly and stored in a housing 34 in a state in which ferrules (connectors) 33 were attached to the other ends of the single-mode optical fibers 32. Consequently, a highly nonlinear module with the single-mode optical fibers 32 drawn out from ferrules was manufactured.

A splicing loss of fusion splicing with the highly nonlinear fiber 10 with a cladding diameter of 60 micrometers was successfully controlled to be 0.1 decibel or less by using the single-mode optical fibers 32 with a cladding diameter of 80 micrometers. Since the highly nonlinear fiber 10 with a cladding diameter of 80 micrometers can also be connected to the single-mode optical fibers 32 with a cladding diameter of 105 micrometers satisfactorily, the single-mode optical fiber 32 with a cladding diameter of 105 micrometers may be used. It is possible to connect single-mode optical fibers with a cladding diameter of 125 micrometers attached with a connector to this module and use the single-mode optical fibers. Note that an inner diameter of the ring may be set to 20 to 60 millimeters.

In a fourth example, first, an optical fiber with a cladding diameter of 60 micrometers shown in FIG. 1 was used as a highly nonlinear fiber and wound in a ring coil shape at a length of 100 meters to manufacture a module. An inner diameter of the ring coil was set to 30 millimeters taking into account reliability.

One ends of the single-mode optical fibers 32 with a cladding diameter of 80 micrometers were fusion-spliced to both ends of the highly nonlinear fiber 10 wound in a ring coil shape. The coil was stored in a housing in a state in which the ferrules were attached to the other ends of the single-mode optical fibers 32. Consequently, a highly nonlinear module with the single-mode optical fibers drawn out from ferrules was manufactured.

A splicing loss of fusion splicing with the highly nonlinear fiber 10 with a cladding diameter of 60 micrometers was successfully controlled to be 0.1 decibel or less by using the single-mode optical fibers 32 with a cladding diameter of 80 micrometers. It is possible to connect single-mode optical fibers attached with connectors to this module and use the single-mode optical fibers. Note that an inner diameter of the ring may be set to 20 to 40 millimeters.

In a fifth example, an optical fiber with a cladding diameter of 60 micrometers was used as the highly nonlinear fiber 10 and wound around the bobbin 20 shown in FIG. 6 at a length of 400 meters to manufacture a module. A winding diameter, that is, the inner diameter $d_2$ of the bobbin 20 was set to 15 millimeters. The bobbin 20 has a shape in which the outer diameter $d_1$ of the collar sections 20b in the bobbin 20 is set to 50 millimeters, the inner width W between the collar sections 20b is set to 4.5 millimeters, and the width $W_1$ of the collar sections 20b is set to 0.5 millimeter.

One ends of single-mode optical fibers with a cladding diameter of 125 micrometers were fusion-spliced to both ends of the highly nonlinear fiber 10 formed in a coil shape. Then, the coil was stored in a housing in a state in which connectors were attached to the other ends of the single-mode optical fibers. Consequently, a highly nonlinear module (HNLM) with the single-mode optical fibers with connectors connected thereto was manufactured.

When a difference between a cladding diameter of the highly nonlinear fiber 10 and a cladding diameter of 125 micrometers of a conventional single-mode optical fiber increases, this makes it extremely difficult to reduce a splicing loss in fusion splicing.

In fusion-splicing optical fibers, end faces of the optical fibers are heated with the end faces butted against each other to melt and connect the optical fibers. If cladding diameters of the optical fibers are different, quantities of heat applied to unit volumes of the respective optical fibers are different. Thus, if heat applied to the optical fibers is suited for the optical fiber with a larger cladding diameter, the optical fiber with a smaller cladding diameter is completely melted to evaporate.

On the other hand, if the heat is suited for the optical fiber with a smaller cladding diameter, a quantity of heat applied to the optical fiber with a larger diameter is insufficient for melting the optical fiber properly. As a result, these optical fibers are not spliced satisfactorily. Since the highly nonlinear fiber with a cladding diameter of 60 micrometers and the single-mode optical fiber with a cladding diameter of 125 micrometers described in the fifth example have significantly different glass volumes, the highly nonlinear fiber and the single-mode optical fiber cannot be connected satisfactorily under normal conditions. Therefore, fusion-splicing conditions are adjusted as described below such that an optical fiber with a cladding diameter of 60 micrometers does not evaporate during splicing to make it possible to splice the optical fiber with the single-mode optical fiber with a cladding diameter of 125 micrometers.

1) A discharge intensity is set low.
2) Time from start of discharge until the optical fibers are butted against each other is set short.
3) The optical fibers are pushed more deeply into each other after the optical fibers are butted against each other to prevent the optical fibers with a cladding diameter of 60 micrometers from being crushed.
4) Discharge time is set short.

In the fusion splicing, a splicing loss was successfully controlled to be 0.3 decibels or less in the fifth example. Since the bobbin 20 was reduced in a size as described above, a size of the module was successfully reduced to 55 millimeters in length, 85 millimeters in width, and 7.5 millimeters in height.

In a sixth example, the highly nonlinear fiber 10 with a cladding diameter of 60 micrometers was used as a highly nonlinear fiber and wound in a ring coil shape at a length of 100 meters to manufacture a module. An inner diameter of the ring was set to 15 millimeters.

One ends of single-mode optical fibers with a cladding diameter of 125 micrometers were fusion-spliced to both ends of the highly nonlinear fiber 10 formed in a ring coil shape. Then, the coil was stored in a housing in a state in which connectors were attached to the other ends of the single-mode optical fibers. Consequently, a highly nonlinear module with single-mode optical fibers drawn out from connectors was manufactured.

Using the fusion splicing conditions described in the fifth example, a splicing loss of fusion splicing of the single-mode optical fiber with a cladding diameter of 125 micrometers and the highly nonlinear fiber 10 with a cladding diameter of 60 micrometers was successfully controlled to be 0.3 decibels or less.

A winding diameter of an optical fiber affects a reduction in a size of a coil of the optical fiber significantly. In other words, since winding distortion of the optical fiber is proportional to a cladding diameter, it is possible to reduce a winding diameter of the optical fiber while controlling an increase in the winding distortion by reducing the cladding diameter. This is advantageous for reducing a size of the coil. When an optical fiber with a cladding diameter of 125 micrometers, which is generally used, is wound at an inner diameter of 60 millimeters, a probability of fatigue failure of the optical fiber is about 0.25%/20 years. This probability of fatigue failure is given by the following Eq. (11).

$$\lambda = \alpha \times N_p \times \{(\beta_p/E^2)/(B/E^2)^\beta\} \times \{(\epsilon^n \times t)^\beta/(\epsilon_p^{n_p} \times t_p)\} \tag{11}$$

where $n_p$ is a fatigue coefficient of the optical fiber in a screening environment, n is fatigue of the optical fiber in an environment of use, $\epsilon_p$ is an applied stress at the time of a screening test, $\epsilon$ is an applied stress in an environment of use, $t_p$ is time during which the applied stress $\epsilon_p$ is applied, t is time during which the applied stress $\epsilon$ is applied, $N_p$ is the number of times of fatigue failure per a unit length at the time of a screening test, m is a Weibull distribution coefficient, $\alpha$ is $m/(n_p-2)$, $\beta$ is $(n_p-2)/(n-2)$, $(B_p/E^2)/(B/E^2)\beta$ is a constant determined by an environment, E is an elastic modulus of the optical fiber, B is a constant, $B_p$ is B in a screening test atmosphere, and $\lambda$ is a probability of fatigue failure.

Main parameters concerning a characteristic of the optical fiber used in this expression are m and $n_p$. In calculating the probability of fatigue failure, "20" described in Telcordia GR-20-CORE, which is internationally recognized, is used as $n_p$, "3" is used as m because m is generally about 3 to 6, and a stress level with which the optical fiber extends by 1 percent is used as $\epsilon_p$.

In the case of an optical fiber with a cladding diameter of 60 micrometers, a probability of fatigue failure at the time when the optical fiber is wound at an inner diameter of 30 millimeters is calculated as about 0.25%/20 years using the same parameters. Therefore, this inner diameter is adopted in the second example and the fourth example. When m and $n_p$ of the highly nonlinear fiber with a cladding diameter of 60 micrometers used in the second example were measured, n and $n_p$ were "1.2" and "27", respectively. If $\epsilon_p$ is set to a stress level with which the optical fiber extends by 1 percent, it is possible to wind the optical fiber at an inner diameter of 20 millimeters while securing reliability. When $\epsilon_p$ is set to a stress level with which the optical fiber extends by 2 percent, it is possible to wind the optical fiber at an inner diameter of 12 millimeters. When $\epsilon_p$ is set to a stress level with which the optical fiber extends by 2.1 percent, it is possible to wind the optical fiber at an inner diameter of 10 millimeters. Based on this result, the inner diameter of 15 millimeters is adopted in the fifth example and the sixth example.

As described above, according to the present embodiment, the optical fiber having the W-segment type profile shown in FIG. 1 is used as a highly nonlinear fiber. However the highly nonlinear fiber is not limited to this. An optical fiber of a structure, in which a refractive index has a W type profile, shown in FIG. 9 may be used.

Figure 9:
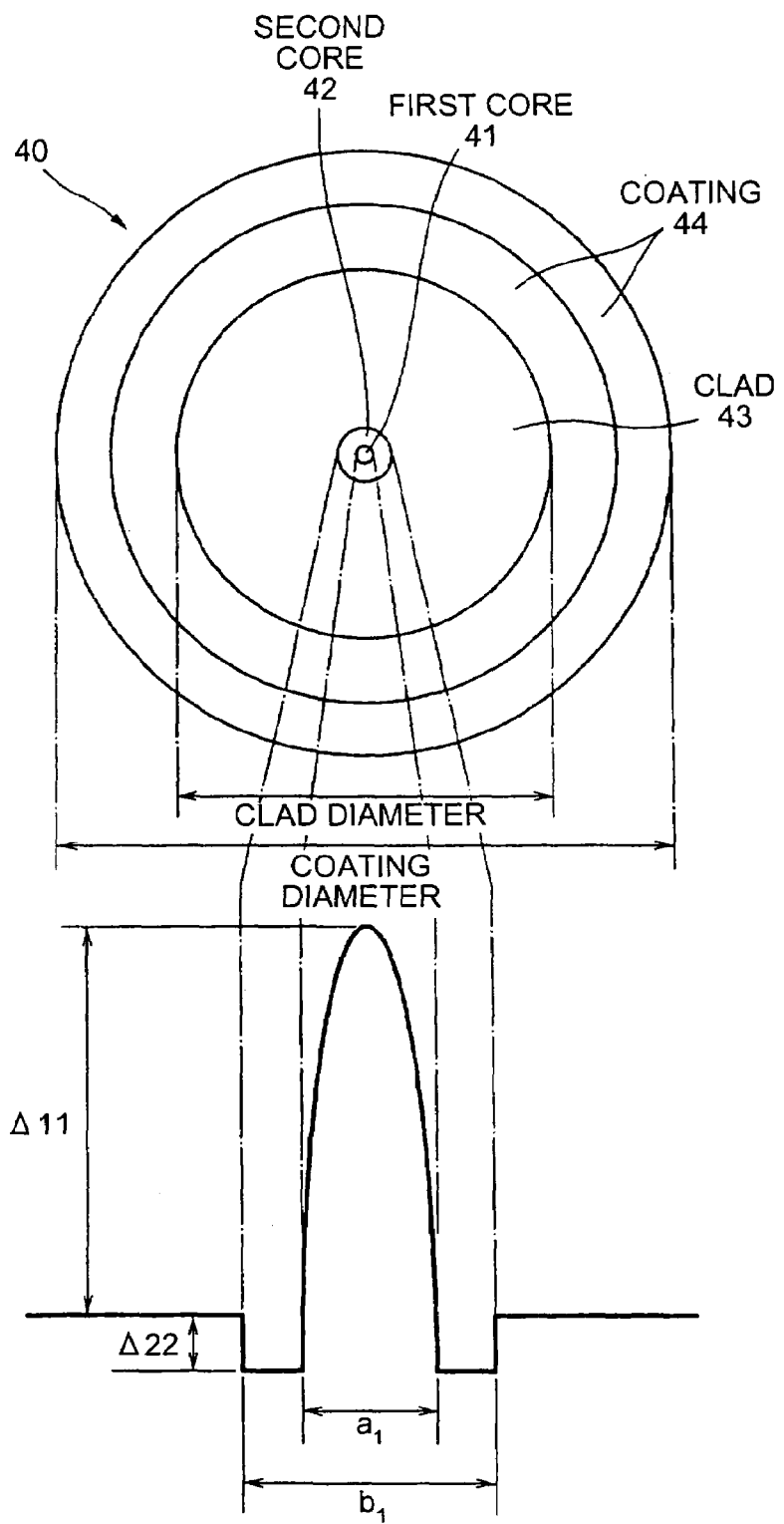
FIG. 9 is a cross section and a refractive index profile of another example of the highly nonlinear fiber according to the present embodiment.

In FIG. 9, a highly nonlinear fiber 40 includes a first core 41 with a diameter of $a_1$ micrometers including an optical axis center, a second core 42 with a diameter of $b_1$ micrometers surrounding the first core 41, and a cladding 43 surrounding the second core 42. The first and the second cores 41 and 42 and the cladding 43 are formed of, for example, a silica ($SiO_2$) based material. A diameter of the cladding 43, that is, a cladding diameter is set as small as, for example, 40 to 70 micrometers or 40 to 80 micrometers.

The first core 41 is formed to have a maximum refractive index of $n_{c11}$ with a predetermined amount of $GeO_2$ doped to $SiO_2$ as a dopant. The second core 42 is formed of a material having a refractive index lower than that of the cladding 43 and having a minimum refractive index of $n_{c22}$ with, for example, a predetermined amount of F doped to $SiO_2$.

The cladding 43 has a refractive index of $n_{c0}$ and is, in general, substantially formed of pure $SiO_2$. However, the cladding 43 may be doped with F.

The respective refractive indexes $n_{c11}$, $n_{c22}$, and $n_{c0}$ of the first core 41, the second core 42, and the cladding 43 are set to have a relation $n_{c11} > n_{c0} > n_{c22}$. A refractive index profile of such an optical fiber 40 is called a W type.

A relative refractive index difference in the profile shown in FIG. 9 is represented as follows. Based on the refractive index $n_{c0}$ of the cladding 43, a relative refractive index difference $\Delta 11$ of the first core 41 is calculated by Eq. (9) and a relative refractive index difference $\Delta 22$ of the second core 42 is calculated by Eq. (10).

$$\Delta 11 = \{(n_{c11} - n_{c0})/n_{c11}\} \times 100\% \tag{9}$$

$$\Delta 22 = \{(n_{c22} - n_{c0})/n_{c22}\} \times 100\% \tag{10}$$

When the optical fiber shown in FIG. 9 is manufactured as a highly nonlinear fiber, main characteristics of the highly nonlinear fiber are shown in Tables 4 to 6.

TABLE 4

$\Delta 11$: 2.8% $\Delta 22$: −0.55%, $a_1/b_1$: 0.6, $b_1$: 6.1 μm

| | | | | | | |
|---|---|---|---|---|---|---|
| Fiber length | km | 0.4 | 0.4 | 0.4 | 0.4 | 0.4 |
| Fiber diameter | μm | 80 | 70 | 60 | 50 | 40 |
| Coating diameter | μm | 128 | 127 | 125 | 124 | 123 |
| Loss(1550 nm) | dB/km | 0.93 | 0.86 | 0.84 | 0.83 | 0.82 |
| Dispersion value(1550 nm) | ps/(nm · km) | 0.09 | 0.87 | 0.11 | 1.02 | 0.25 |
| Dispersion slope(1550 nm) | ps/(nm² · km) | 0.017 | 0.017 | 0.016 | 0.018 | 0.024 |
| $\lambda_0$ | nm | 1544.7 | 1500.2 | 1543.5 | 1491.5 | 1539.7 |
| Cut-off wavelength | nm | 1436 | 1370 | 1433 | 1383 | 1424 |
| MFD(1550 nm) | μm | 4.1 | 4.0 | 4.1 | 4.1 | 4.2 |
| Aeff(1550 nm) | μm² | 11.1 | 11.3 | 11.4 | 11.2 | 11.8 |
| PMD | ps/km^½ | 0.08 | 0.08 | 0.11 | 0.05 | 0.12 |
| Bending loss(φ20 nm, 1550 nm) | dB/m | <0.01 | <0.01 | <0.01 | <0.01 | <0.01 |
| γ | 1/W/km | 19.0 | 20.9 | 19.6 | 17.9 | 18.3 |

TABLE 5

$\Delta 11$: 2.8% $\Delta 22$: −1.0%, $a_1/b_1$: 0.4, $b_1$: 9.1 μm

| | | | | | | |
|---|---|---|---|---|---|---|
| Fiber length | km | 0.4 | 0.4 | 0.4 | 0.4 | 0.4 |
| Fiber diameter | μm | 80 | 70 | 60 | 50 | 40 |
| Coating diameter | μm | 128 | 126 | 125 | 123 | 122 |
| Loss(1550 nm) | dB/km | 1.29 | 1.18 | 1.10 | 1.09 | 1.06 |
| Dispersion value(1550 nm) | ps/(nm · km) | −0.56 | −0.08 | −0.18 | 1.12 | 0.24 |
| Dispersion slope(1550 nm) | ps/(nm² · km) | 0.011 | 0.011 | 0.010 | 0.014 | 0.010 |
| $\lambda_0$ | nm | 1603.5 | 1557.0 | 1567.5 | 1467.4 | 1525.7 |

TABLE 5-continued

| Δ11: 2.8% Δ22: −1.0%, $a_1/b_1$: 0.4, $b_1$: 9.1 μm | | | | | | |
|---|---|---|---|---|---|---|
| Cut-off wavelength | nm | 1370 | 1354 | 1239 | 1224 | 1359 |
| MFD(1550 nm) | μm | 3.5 | 3.5 | 3.5 | 3.5 | 3.5 |
| Aeff(1550 nm) | μm² | 10.3 | 10.1 | 10.2 | 10.3 | 10.2 |
| PMD | ps/km½ | 0.13 | 0.13 | 0.03 | 0.01 | 0.02 |
| Bending loss(φ20 nm, 1550 nm) | dB/m | <0.01 | <0.01 | <0.01 | <0.01 | <0.01 |
| γ | 1/W/km | 22.5 | 24.6 | 22.5 | 24.5 | 23.3 |

TABLE 6

| Δ1: 2.0% Δ2: −0.55%, $a_1/b_1$: 0.57, $b_1$: 7.8 μm | | | | | | |
|---|---|---|---|---|---|---|
| Fiber length | km | 0.4 | 0.4 | 0.4 | 0.4 | 0.4 |
| Fiber diameter | μm | 80 | 70 | 60 | 50 | 40 |
| Coating diameter | μm | 127 | 126 | 125 | 123 | 123 |
| Loss(1550 nm) | dB/km | 0.39 | 0.38 | 0.35 | 0.35 | 0.35 |
| Dispersion value(1550 nm) | ps/(nm · km) | −0.28 | 0.13 | 0.16 | 0.18 | −0.18 |
| Dispersion slope(1550 nm) | ps/(nm² · km) | 0.023 | 0.023 | 0.017 | 0.018 | 0.008 |
| $\lambda_0$ | nm | 1562.0 | 1544.3 | 1540.6 | 1540.3 | 1573.5 |
| Cut-off wavelength | nm | 1195 | 1190 | 1160 | 1217 | 1110 |
| MFD(1550 nm) | μm | 4.4 | 4.4 | 4.7 | 4.4 | 4.7 |
| Aeff(1550 nm) | μm² | 14.4 | 13.6 | 14.8 | 14.1 | 14.6 |
| PMD | ps/km½ | 0.13 | 0.04 | 0.02 | 0.06 | 0.03 |
| Bending loss(φ20 nm, 1550 nm) | dB/m | <0.01 | <0.01 | <0.01 | <0.01 | <0.01 |
| γ | 1/W/km | 12.2 | 12.8 | 11.1 | 12.4 | 11.9 |

As described above, the diameter of the coating is set to 125 micrometers ±5%. This makes it possible to provide a highly nonlinear fiber that can be formed in a small size when wound in a coil shape and can improve connectivity with the optical fiber for connecting an inspection apparatus having a cladding diameter of 125 micrometers when a cladding is exposed by stripping a coating. In addition, it is possible to provide a highly nonlinear fiber module that uses the highly nonlinear fiber.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A highly nonlinear optical fiber comprising:
   a core;
   a cladding surrounding the core; and
   a coating covering the cladding, wherein
   a bending loss at a wavelength of 1550 nanometers with a bending diameter of 20 millimeters is equal to or less than 0.01 dB/m,
   a nonlinear coefficient at the wavelength of 1550 nanometers is equal to or more than 10 $W^{-1}km^{-1}$,
   a cut-off wavelength is equal to or less than 1530 nanometers,
   a zero dispersion wavelength is in a range between 1400 nanometers and 1650 nanometers, and
   a diameter of the coating is 125 micrometers with a tolerance of ±5 percent.

2. The highly nonlinear optical fiber according to claim 1, wherein the diameter of the coating is 95 percent to 105 percent of a diameter of the cladding of the dummy optical fiber connected for a characteristic test.

3. The highly nonlinear optical fiber according to claim 1, wherein a diameter of the cladding is in a range between 40 micrometers and 80 micrometers.

4. The highly nonlinear optical fiber according to claim 1, wherein a diameter of the cladding is in a range between 40 micrometers and 70 micrometers.

5. The highly nonlinear optical fiber according to claim 1, wherein the core includes
   a first core that is located at a center position, having a first refractive index; and
   a second core surrounding the first core, having a second refractive index, and
   the cladding has a third refractive index that is lower than the first refractive index and higher than the second refractive index, and
   a relative refractive index difference of the second core with respect to the cladding is equal to or less than −0.3 percent.

6. The highly nonlinear optical fiber according to claim 5, wherein the core further includes a third core between the second core and the cladding, having a fourth refractive index that is lower than the first refractive index and higher than the third refractive index.

7. A highly nonlinear optical fiber module comprising a highly nonlinear optical fiber including a core, a cladding surrounding the core, and a coating covering the cladding, wherein
   a bending loss at a wavelength of 1550 nanometers with a bending diameter of 20 millimeters is equal to or less than 0.01 dB/m,
   a nonlinear coefficient at the wavelength of 1550 nanometers is equal to or more than 10 $W^{-1}km^{-1}$,
   a cut-off wavelength is equal to or less than 1530 nanometers,
   a zero dispersion wavelength is in a range between 1400 nanometers and 1650 nanometers, and
   a diameter of the coating is 125 micrometers with a tolerance of +5 percent.

8. The highly nonlinear optical fiber module according to claim 7, wherein
   a single mode fiber is connected to both ends of the highly nonlinear optical fiber, and a cladding diameter of the single mode fiber is in a range between 80 micrometers and 130 micrometers.

9. The highly nonlinear optical fiber module according to claim 7, wherein
a single mode fiber is connected to both ends of the highly nonlinear optical fiber, and
a cladding diameter of the single mode fiber is in a range between 120 micrometers and 130 micrometers.

10. The highly nonlinear optical fiber module according to claim 7, wherein
a single mode fiber is connected to both ends of the highly nonlinear optical fiber, and
a cladding diameter of the single mode fiber is in a range between 80 micrometers and 105 micrometers.

11. The highly nonlinear optical fiber module according to claim 7, wherein
the highly nonlinear optical fiber is wound around a bobbin, and
an outer diameter of the bobbin satisfies $$\sqrt{\{(L/650W)+d_2^2/d_f^2\}+2d_1} \leq d_1 \{ \leq (L/650W)+d_2^2/d_f^2\}+10$$

where $d_1$ is the outer diameter of the bobbin, L is a length of the highly nonlinear optical fiber, W is an inner width between both collars of the bobbin, $d_2$ is an inner diameter of the bobbin, and $d_f$ is the diameter of the coating.

12. The highly nonlinear optical fiber module according to claim 7, wherein
the highly nonlinear optical fiber is wound around a bobbin, and
an inner diameter of the bobbin is in a range between 10 millimeters and 60 millimeters.

13. The highly nonlinear optical fiber module according to claim 7, wherein
the highly nonlinear optical fiber is wound around a bobbin, and
an inner diameter of the bobbin is in a range between 10 millimeters and 40 millimeters.

14. The highly nonlinear optical fiber module according to claim 7, wherein
the highly nonlinear optical fiber is wound around a bobbin, and
an inner width between both collars of the bobbin is in a range between 4 millimeters and 20 millimeters.

15. The highly nonlinear optical fiber module according to claim 7, wherein
the highly nonlinear optical fiber is wound around a bobbin, and
an inner width between both collars of the bobbin is in a range between 4 millimeters and 10 millimeters.

16. The highly nonlinear optical fiber module according to claim 7, wherein
the highly nonlinear optical fiber is wound in a ring coil shape, and
an inner diameter of the ring coil shape is in a range between 10 millimeters and 60 millimeters.

17. The highly nonlinear optical fiber module according to claim 7, wherein
the highly nonlinear optical fiber is wound in a ring coil shape, and
an inner diameter of the ring coil shape is in a range between 10 millimeters and 60 millimeters.

* * * * *